(12) United States Patent
Cognolato et al.

(10) Patent No.: US 11,873,901 B2
(45) Date of Patent: Jan. 16, 2024

(54) INTEGRATED SEALING DEVICE FOR MOTORCYCLE SUSPENSIONS

(71) Applicant: Aktiebolaget SKF, Gothenburg (SE)

(72) Inventors: Gianni Alvise Cognolato, Moncalieri (IT); Marco Bresso, Turin (IT); Paolo Giraudo, Trana (IT)

(73) Assignee: AKTIEBOLAGET SKF

( * ) Notice: Subject to any disclaimer, the term of this patent is extended or adjusted under 35 U.S.C. 154(b) by 461 days.

(21) Appl. No.: 17/288,353

(22) PCT Filed: Oct. 24, 2019

(86) PCT No.: PCT/EP2019/079079
§ 371 (c)(1),
(2) Date: Apr. 23, 2021

(87) PCT Pub. No.: WO2020/089041
PCT Pub. Date: May 7, 2020

(65) Prior Publication Data
US 2021/0381599 A1    Dec. 9, 2021

(30) Foreign Application Priority Data
Oct. 31, 2018   (IT) .................. 102018000009946

(51) Int. Cl.
*F16J 15/3232*   (2016.01)
*B62K 25/06*   (2006.01)
(Continued)

(52) U.S. Cl.
CPC ........... *F16J 15/3232* (2013.01); *B62K 25/06* (2013.01); *F16J 15/164* (2013.01);
(Continued)

(58) Field of Classification Search
CPC ....... F16C 33/74; F16C 2326/26; F16J 15/16; F16J 15/164; F16J 15/3204; F16J 15/322;
(Continued)

(56) References Cited

U.S. PATENT DOCUMENTS 4,178,002 A    12/1979   Kayser
7,837,017 B2 *   11/2010   Imoto ...................... F16F 9/36
277/560
(Continued)

FOREIGN PATENT DOCUMENTS

GB         960130      6/1964
JP        H08258778   10/1996

OTHER PUBLICATIONS

Search Report for corresponding Italy Patent Application No. 102018000009946 dated Jul. 25, 2019.
(Continued)

*Primary Examiner* — Phillip A Johnson
(74) *Attorney, Agent, or Firm* — Reed Smith LLP

(57) ABSTRACT

A sealing device for a motorcycle suspension provided with an armature on which an elastomeric covering is mounted, said covering comprising a first radially outer portion, for providing a dynamic seal with a first component of the motorcycle suspension, and a second radially inner portion for providing a guide and a static seal with a second component of the motorcycle suspension, on which the sealing device is mounted; the elastomeric covering is integrally connected to the armature and the radially outer portion has at least one first, flexible, annular sealing lip which projects, protruding in a radially and axially external direction so as to cooperate, during use, in a sliding manner, with a surface of the first component of the motorcycle suspension.

20 Claims, 4 Drawing Sheets

(51) Int. Cl.
*F16J 15/16* (2006.01)
*F16J 15/3252* (2016.01)
*F16J 15/3284* (2016.01)
*F16J 15/3216* (2016.01)

(52) U.S. Cl.
CPC ....... *F16J 15/3216* (2013.01); *F16J 15/3252* (2013.01); *F16J 15/3284* (2013.01)

(58) Field of Classification Search
CPC .. F16J 15/3232; F16J 15/3248; F16J 15/3252; F16J 15/3284; B62K 25/06; B62K 25/08; B62K 25/10; B62K 25/14; B62K 25/16; B62K 25/18; B62K 25/20; B62K 25/22; B62K 25/24; B62K 25/26
See application file for complete search history.

(56) References Cited

U.S. PATENT DOCUMENTS

| 2003/0019692 | A1* | 1/2003 | Downes | F16J 15/3252 184/105.3 |
| 2006/0071430 | A1* | 4/2006 | Downes | F16J 15/3252 277/549 |
| 2006/0103075 | A1* | 5/2006 | Zahn | B62K 25/08 277/436 |
| 2007/0007731 | A1* | 1/2007 | Zahn | F16J 15/3232 277/551 |
| 2011/0101584 | A1 | 5/2011 | Viault et al. | |
| 2014/0021695 | A1* | 1/2014 | Watanabe | B62K 25/08 280/279 |
| 2015/0362075 | A1* | 12/2015 | Kubota | B62K 21/02 277/569 |

OTHER PUBLICATIONS

Search Report for corresponding International Application No. PCT/EP19/79079 dated Nov. 11, 2019.

\* cited by examiner

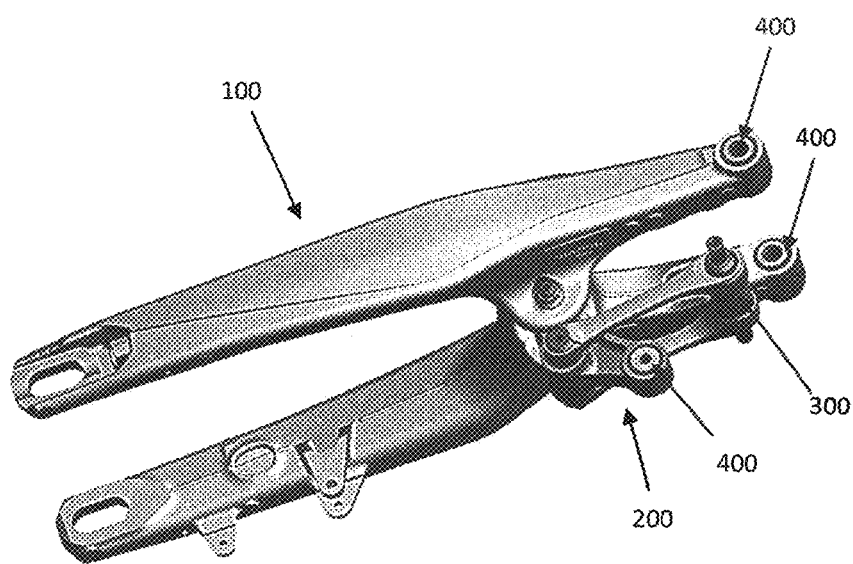
Fig. 1 – Prior Art
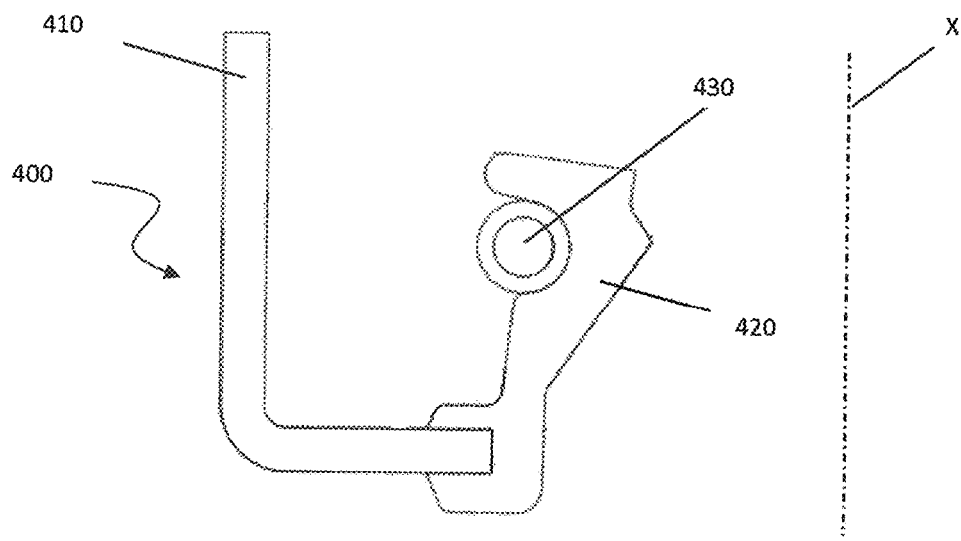
Fig. 2 – Prior Art

INTEGRATED SEALING DEVICE FOR MOTORCYCLE SUSPENSIONS

CROSS-REFERENCE TO RELATED APPLICATION

This application is a 371 National Stage of International Application No. PCT/EP2019/079079, filed Oct. 24, 2019, which was published as International Publication No. WO 2020/089041, and which claims the benefit of the earlier filing date of Italian Patent Application No. 102018000009946 filed on Oct. 31, 2018 the disclosure of which is incorporated by reference herein.

FIELD

The present disclosure relates to an integrated sealing device for motorcycle suspensions. In particular, the sealing device is suitable for use in the rear suspension of a motorcycle and, more particularly, in the components of such a suspension, called swing arm and triangular lever.

BACKGROUND

As is known, the suspension of a motorcycle performs mainly the function of absorbing the roughness of the road surface and ensuring that the wheels remain, where possible, always in contact with the ground. The motorcycle suspension comprises an elastic element, for example a helical spring, which supports a weight and a hydraulic or shock-absorbing system, able to dampen the oscillations produced following a sudden variation in the position of the suspension wheel.

BRIEF DESCRIPTION OF THE DRAWINGS

Embodiments of the disclosure will now be described with reference to the accompanying drawings which illustrate a non-limiting example of embodiment thereof, in which:

FIG. 1 is an axonometric view of the swing arms and the triangular lever of a motorcycle suspension according to the prior art;

FIG. 2 is a schematic illustration of an oil sealing gasket according to the prior art;

DETAILED DESCRIPTION

Figure 3:
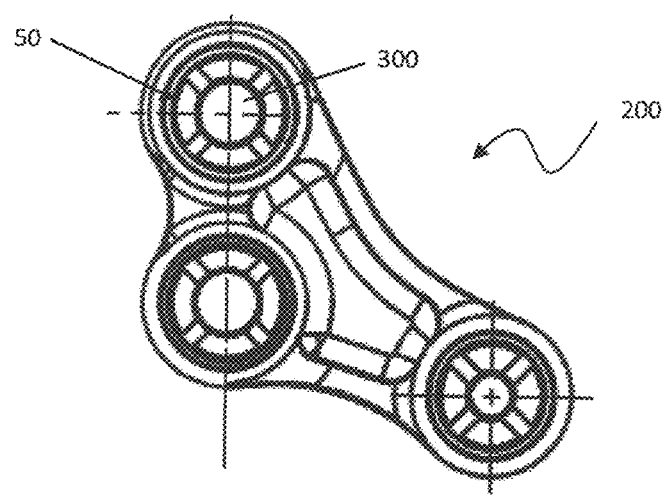
FIG. 3 is an axonometric view of a triangular lever of a motorcycle suspension provided with a sealing device according to embodiments of the disclosure.

A further component of the motorcycle suspension is the so-called swing arm. The swing arm connects the rear wheel to the chassis. By means of the use of one or more suspensions it controls the movement of the chassis with respect to the tyre and, in particular, by means of the shock absorber it slows down oscillation.

The characteristic features of a swing arm are usually a compromise between the need to ensure road grip and need for comfort, their main purpose in terms of use being in any case that of obtaining, generally and along the various roadways, an optimum stability of the vehicle and high degree of comfort for the rider and any passengers.

The swing arm may have various forms and be classified as different types depending on the variants of the different systems which ensure the relative movement of chassis and wheels. The connection with the suspension may be performed in different ways. For example, the connection may be directly together with the suspension which directly engages with the swing arm. According to another example, the connection is performed by means of a system of levers and arms which enable a non-linear reaction of the suspension to be obtained. Generally the lever system is used to obtain a small compression of the helical spring along the initial part of the displacement of the wheel, so as to ensure a greater riding comfort on uneven ground, and then gradually increase the compression of the helical spring as the displacement of the wheel increases.

FIG. 1 shows, by way of example and according to the prior art, a pair of swing arms 100 of a motorcycle suspension which are hinged together by means of lever systems and, in particular, a triangular lever 200. The hinged connections of these components are realized by means of suitable pins 300. Since both the swing arms and the triangular lever must be able to rotate, they contain rolling or sliding bearings. These bearings are lubricated with oil or grease and require protection from external contaminants in order to ensure the operation thereof over time. Components are therefore provided (indicated in FIG. 1 by the reference number 400) for preventing the lubricant from escaping and at the same time the entry inside the bearing of contaminants from the external environment (water, dust, mud, etc.).

The sealing devices, according to the prior art, consist of standard oil gaskets 400 mounted on a bush (not visible in FIG. 1) which is integral with the triangular lever or swing arm and inside which the pivot pin 300 is inserted. FIG. 2 shows an example of such oil gaskets, in an axially symmetric view with respect to an axis X of hinging of the bush relative to the pin. The oil gasket 400 comprises an insert 410 made of metallic material, a sealing lip 420 made of elastomeric material and forming a seal situated radially inwardly and therefore on the pivot pin. The sealing action is ensured by an elastic element 430 which pushes the lip 420 in a radially internal direction. Since there exists a relative rotation between bush and pin, the seal which is formed is a radially inner dynamic seal.

This known solution, although well-established, has a number of drawbacks. A first drawback is the high degree of friction which is generated between the gasket and pivot pin owing to the fact that the sealing action is provided, as mentioned, by means of the elastic force which pushes the sealing lip and therefore opposes the relative rotation of pin and bush.

A second drawback is associated with the fact that assembly is not very easy: the gasket is mounted in position and then the bush is inserted inside the gasket. Assembly is therefore composed of two stages and involves the risk of incorrect positioning of the sealing lip (risk of folding).

A further drawback arises during maintenance of the said gasket. Typically cleaning of the gasket is performed by blowing in a jet of pressurized water. Owing to the way in which the seal is formed, the pressurized water jet, if on the one hand it performs cleaning of the seal, on the other hand it negatively affects the sealing action of the lip, pushing it in a radially outer direction with the risk that some of the contaminant may penetrate inside the suspension.

Finally, it should be remembered that these gaskets work only inwardly, namely on the pivot pin, but not outwardly, i.e. on the inner side surface of the triangular lever or the swing arm.

There therefore exists the need to provide a sealing device for motorcycle suspensions which is able to eliminate or at least minimize the aforementioned drawbacks.

The object of the embodiments of the disclosure is to provide a sealing device for motorcycle suspensions which does not have the aforementioned drawbacks.

According to a first aspect, the sealing device minimizes the frictional force acting on the pivot pin since it is devoid of the elastic element of conventional oil sealing gaskets. This is achieved by designing a sealing device having at least one sealing lip with a form such as not to require the assistance of the elastic element.

Moreover, the sealing device according to the present disclosure is integrated with the bush and therefore may be more easily mounted inside the triangular lever or the fork compared to the known solutions.

According to a further aspect, the sealing device allows a double seal to be provided, both inwardly, in a static manner, relative to the pivot pin, and outwardly, in a dynamic manner, relative to the contact surface of the triangular lever or the swing arm. In this way the sealing efficiency in respect of external contaminants is improved.

Advantageously, the dynamic seal may be improved by also providing a second sealing lip, in addition to the first sealing lip, which acts as a first barrier against the external contaminant.

Moreover, the geometric form of the sealing device according to embodiments of the present disclosure is such that a contaminant collection zone may be defined. In this way, the contaminant may be easily removed during the operations for maintenance or cleaning of said device, for example using a compressed air jet.

According to a further aspect, the geometric form of the sealing lip—or sealing lips—is such that, when the jet of compressed water is blown in, the lip tends to expand in a radially outer direction, performing its sealing function in the most efficient manner and therefore preventing part of the contaminant from penetrating inside the triangular lever or swing arm rather being removed. Only during this stage is the lip stressed towards the external seat, while during operation when mounted the geometrical form of the lip results in a small amount of dynamic friction due to the reduced radial load.

According to embodiments of the present disclosure, therefore, a sealing device for motorcycle suspensions having the characteristic features indicated in the attached independent claim is provided.

Further preferred and/or particularly advantageous embodiments of the disclosure are described.

With reference to FIG. 3 this shows an axonometric view of a component of a motorcycle suspension, in this example a triangular lever 200 which is hinged together with a pivot pin 300 and is provided with a sealing device 50, according to embodiments of the disclosure.

Figure 4:
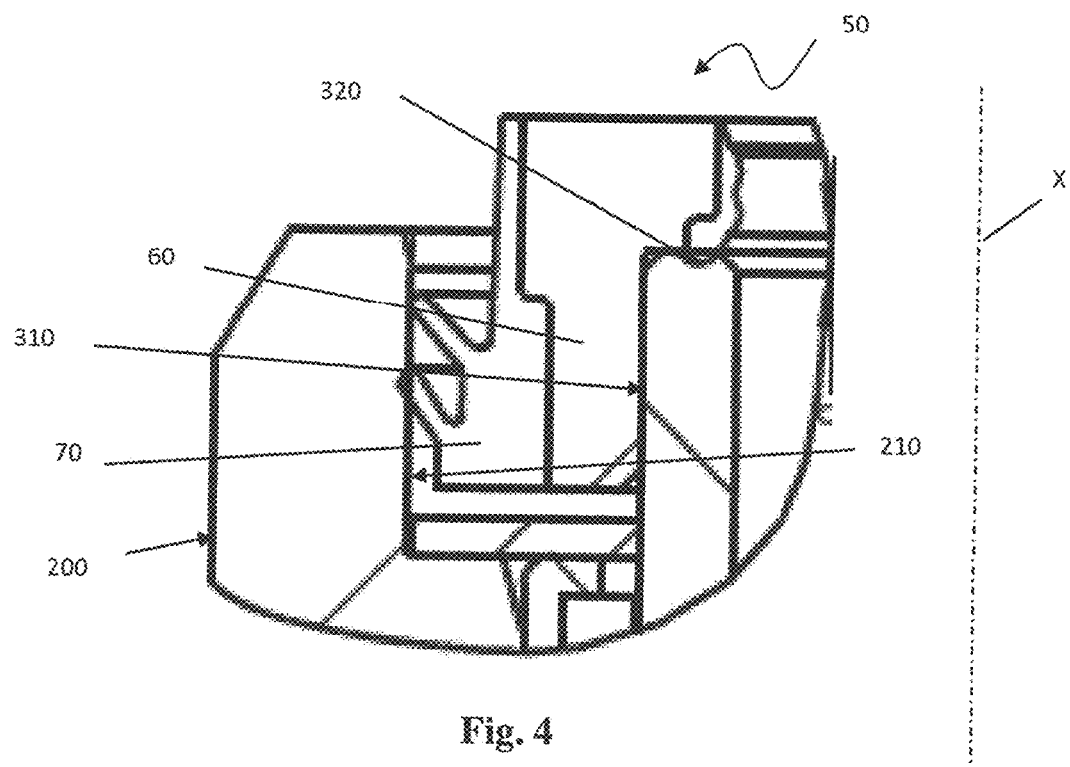
FIG. 4 is a partial axially symmetric cross-section of the sealing device according to embodiments of the disclosure, mounted between the triangular lever and the associated pivot pin.

FIG. 4 shows a partial axially symmetric cross-section of the same components. It can be understood that relative rotations of the triangular lever 200 and pivot pin 300 (not shown in FIG. 4) about the axis of rotation X are possible. The sealing device 50 is mounted between the triangular lever and the pin. The comments made below, in the continuation of the illustrative description of the sealing device mounted on the triangular lever, are likewise applicable to the case where, instead of the triangular lever, other components of a motorcycle suspension—for example a swing bar or other components of the suspension mechanism—are considered.

It is also assumed that, in the whole of the present description and the claims, the terms and expressions indicating positions and orientations, such as "radial" and "axial", are understood as being in relation to the central axis of rotation X of the components of the suspension considered, for example the triangular lever and associated pivot pin. Expressions such as "radially outer" and "radially inner" denote therefore positions relative to the axis of rotation X. Expressions such as "axially outer" and "axially inner" refer instead to the assembled condition and, in the case in question, preferably, refer to a side external to the suspension components, and therefore in contact with the external environment and, respectively, a side situated opposite and therefore towards the inside of the said components.

As can be seen in FIG. 4, the sealing device 50 comprises an armature 60 which is made of metallic material and on which, by means of known methods, for example a vulcanization method, an elastomeric covering 70 is mounted. This is the first innovative feature of such as device: compared to the known solutions, gasket and bush are combined together in a single component and do not require any elastic element which pushes the elastomeric covering in the radial direction since the sealing performance, as will become clearer below, is provided by means of the geometric form alone of the covering. The absence of an elastic force, which acts on the sealing elements, has the effect that the leakages due to friction are reduced significantly: from computer analyses and tests a reduction in the frictional forces of up to 60-70% compared to the known solutions is obtained.

The sealing device 50 is mounted on a side surface 310 of the pivot pin 300, by means of a forced connection between armature 60 and pivot pin 300, and therefore the sealing device 50 is integral with the said pin. The sealing device 50 may therefore provide a static seal on an annular surface 320 of the pivot pin 300. By means of at least one sealing lip, which will be described below, the device also forms a seal on a side surface 210 of the triangular lever 200, the seal in this case being defined as dynamic, if it is remembered that the device is stably connected to the pin and that the triangular lever and pin may perform a relative rotation with respect to each other. The possibility of providing a double seal—a radially inner static seal and a radially outer dynamic seal—represents a second innovative feature of the device forming the subject of embodiments of the disclosure.

Figure 5:
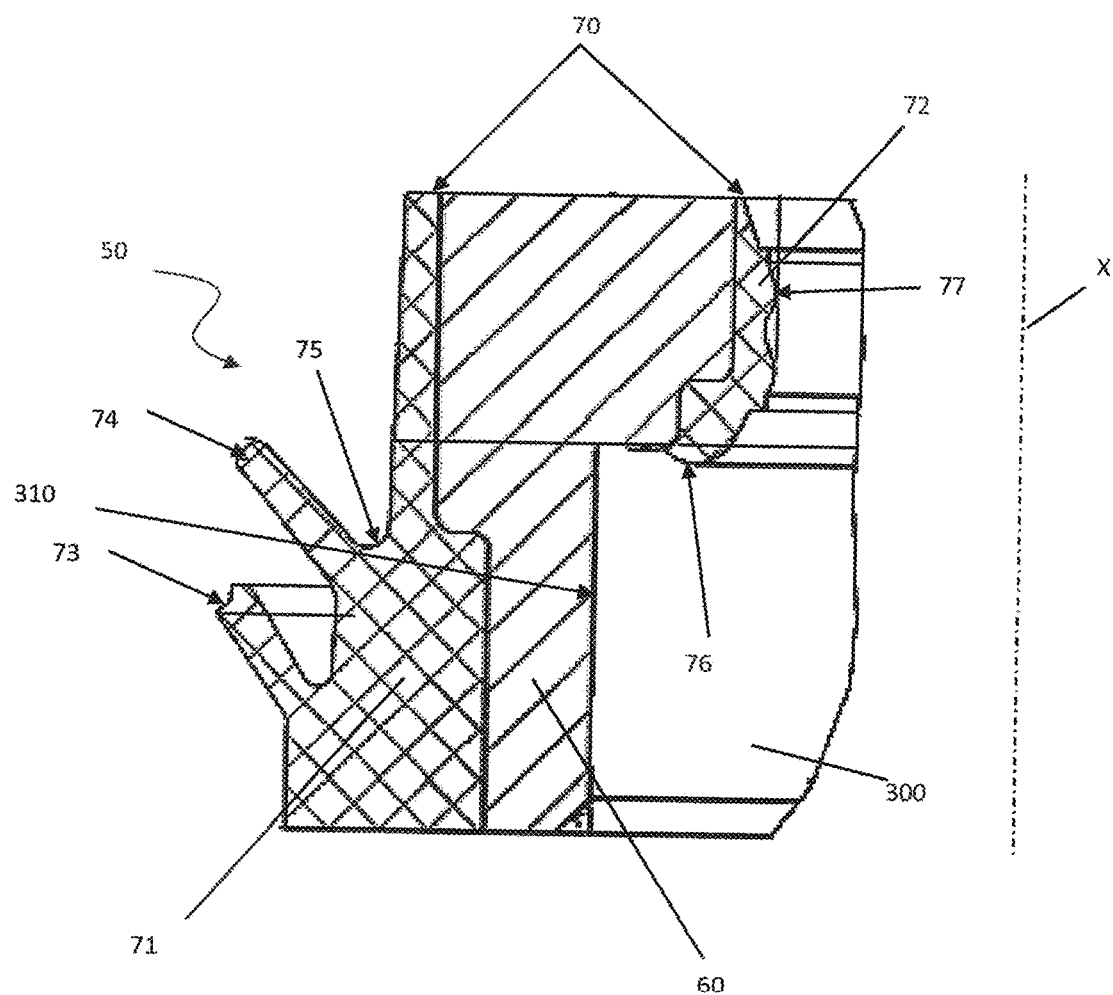
FIG. 5 is a partial axially symmetric cross-section of the sealing device according to FIG. 4.
Figure 6:
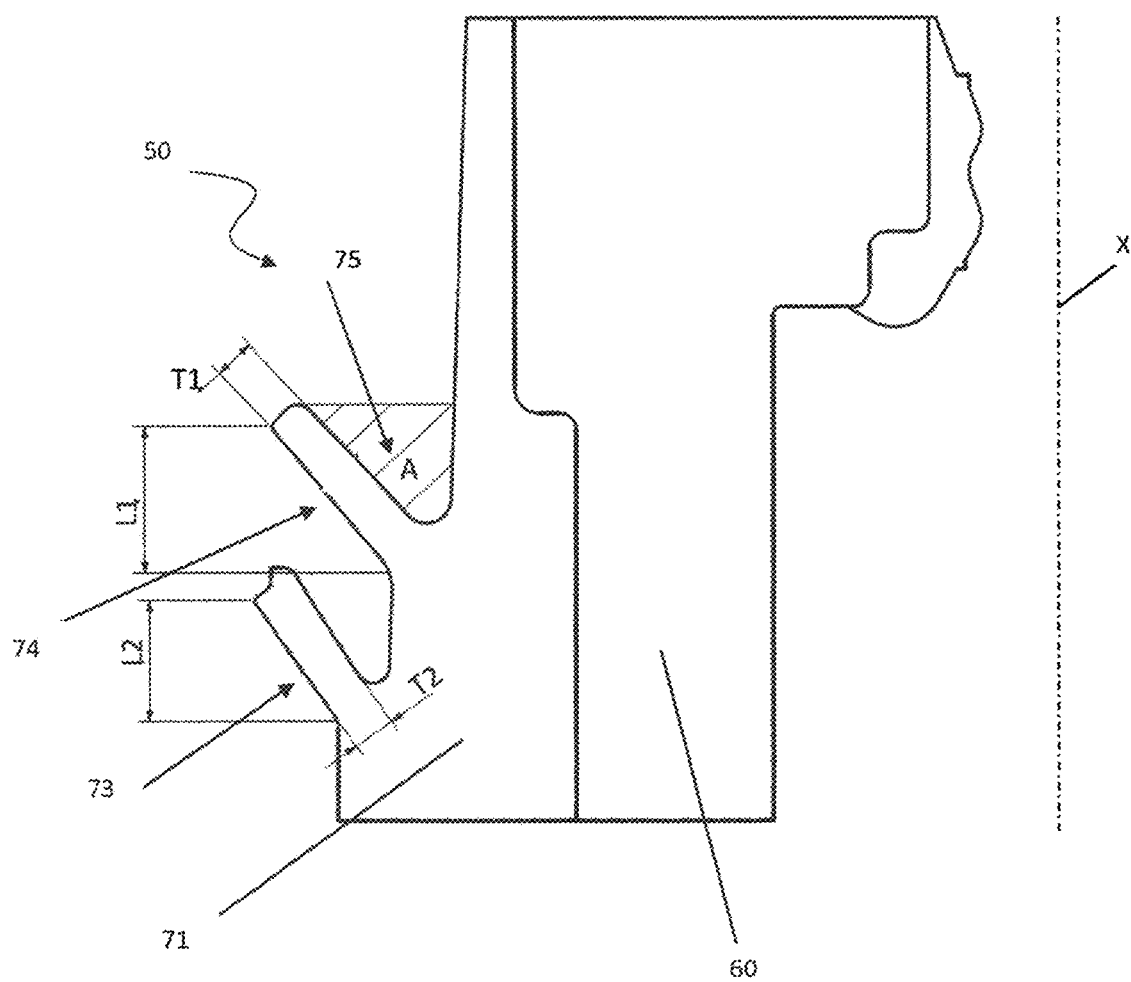
FIG. 6 is a further partial axially symmetric view of the sealing device according to FIG. 4.

With reference to FIGS. 5 and 6, the further innovative features of the sealing device 50 may be understood. Firstly the elastomeric covering 70 is divided into two portions: a first radially outer portion 71, intended for the dynamic seal, and a second radially inner portion 72, having guiding and static sealing functions. The radially outer portion 71 has at least one first, flexible, annular sealing lip 73 which projects, protruding in a radially and axially external direction so as to cooperate, during use, in a sliding manner, with the surface 210 of the triangular lever and perform its function as a main sealing element. Computer analyses carried out on the sealing device 50 have shown that, in order to ensure the correct flexibility and strength characteristics of the annular sealing lip 73, the ratio between the thickness of the lip $T2$ and its axial projection length $L2$ must be preferably between 0.25 and 0.43.

Advantageously, the radially outer portion 71 may have a second, flexible, annular sealing lip 74 which also projects, protruding in a radially and axially external direction so as to cooperate, during use, in a sliding manner, with the surface 210 of the triangular lever. This second annular lip 74 is located in an axially external position with respect to the first annular lip 73 and therefore act as a first barrier against the external contaminant, improving the overall sealing performance of the device.

In this case also, computer analyses have shown that, in order to ensure the correct flexibility and strength characteristics of the annular sealing lip 74, the ratio between the thickness of the lip T1 and its axial projection length L1 must be preferably between 0.20 and 0.39.

Owing to its geometrical form, the radially outer portion 71 may also have a contaminant collection zone 75 which is radially internal with respect to the second annular sealing lip 74. The surface area A of the collection zone 75 must be preferably not less than 1.2 mm². In this way, the contaminant may be easily removed during the operations for maintenance or cleaning of said device, for example using a compressed air jet. In this connection it should be pointed out that, owing to the geometrical form of the sealing lip or the sealing lips which—it is emphasized—protrude in a radially and axially external direction, when the compressed water jet is blown in, the said lip (or lips) tend(s) to expand in the radially external direction, performing its sealing action in the most efficient manner and therefore preventing part of the contaminant from penetrating inside the triangular lever rather than being removed.

The radially inner portion 72 has an axially inner surface 76 which ensures an optimum static seal by means of interference with the annular surface 320 of the pivot pin 300. The same radially inner portion 72 also has an inner diameter 77 which has a guiding function in the device assembly operations, both as regards the forced connection between armature 60 and side surface 310 of the pivot pin 300 and as regards the correct static seal between the surface 76 of the radially inner portion 72 and the surface 320 of the pivot pin 300.

In addition to the embodiments of the disclosure, as described above, it is to be understood that numerous further variants are possible. It must also be understood that said embodiments are only examples and do not limit the subject of the disclosed embodiments, nor its applications, nor its possible configurations. On the contrary, although the description provided above enables the person skilled in the art to implement the embodiments of the disclosure at least in one of its examples of configuration, it must be understood that numerous variations of the components described are feasible, without thereby departing from the scope of the embodiments of the disclosure, as defined in the accompanying claims, interpreted literally and/or in accordance with their legal equivalents.

What is claimed is:

1. A sealing device configured for a motorcycle suspension comprising:
    an armature on which an elastomeric covering is mounted, said elastomeric covering comprising in turn:
    a first radially outer portion configured for providing a dynamic seal with a first component of the motorcycle suspension, and
    a second radially inner portion, configured for providing a guide and a static seal with a second component of the motorcycle suspension on which the sealing device is mounted;
    wherein the elastomeric covering is integrally connected to the armature and the radially outer portion has at least one first, flexible, annular sealing lip which projects, protruding in a radially and axially external direction, so as to be configured to cooperate, during use, in a sliding manner, with a surface of the first component of the motorcycle suspension.

2. The sealing device according to claim 1, wherein the ratio between a thickness (T2) of the first annular sealing lip and an axial projection length (L2) of the same first annular sealing lip is between 0.25 and 0.43.

3. The sealing device according to claim 2, wherein the radially outer portion has a second, flexible, annular sealing lip which projects, protruding in a radially and axially external direction, so as to be configured to cooperate, during use, in a sliding manner, with the surface of the first component of the motorcycle suspension, said second annular sealing lip being in an axially external position with respect to the first annular sealing lip, in order to provide a first seal against external contaminants.

4. The sealing device according to claim 3, wherein the ratio between a thickness (T1) of the second annular sealing lip and an axial projection length (L1) of the same second sealing annular lip is between 0.20 and 0.39.

5. The sealing device according to claim 4, wherein the radially outer portion has a contaminant collection zone, radially internal with respect to the second annular sealing lip.

6. The sealing device according to claim 5, wherein a surface area (A) of the collection zone is not less than 1.2 mm².

7. The sealing device according to claim 6, wherein the radially inner portion has an axially internal surface which is configured to provide a static seal by interference with an annular surface of the second component of the motorcycle suspension.

8. The sealing device according to claim 7, wherein the radially inner portion has an inner diameter which is configured to act as a guide in the assembly of the sealing device on the second component of the motorcycle suspension.

9. The sealing device according to claim 8, wherein the first component of the motorcycle suspension is a swing arm or a triangular lever and the sealing device is configured to provide a dynamic seal by the first annular sealing lip with the surface of the swing arm or the triangular lever.

10. The sealing device according to claim 9, wherein the second component of the motorcycle suspension is a pivot pin of the swing arm or the triangular lever and that said sealing device is configured to be stably connected to the pivot pin by a forced connection between the armature and a lateral surface of the pivot pin.

11. A motorcycle suspension comprising:
    a first component;
    a second component; and
    a sealing device comprising:
        an armature on which an elastomeric covering is mounted, said elastomeric covering comprising in turn:
        a first radially outer portion providing a dynamic seal with the first component of the motorcycle suspension, and
        a second radially inner portion, providing a guide and a static seal with the second component of the motorcycle suspension on which the sealing device is mounted;
        wherein the elastomeric covering is integrally connected to the armature and the radially outer portion has at least one first, flexible, annular sealing lip which projects, protruding in a radially and axially external direction, so as to cooperate, during use, in a sliding manner, with a surface of the first component of the motorcycle suspension.

12. The motor cycle suspension according to claim 11, wherein the ratio between a thickness (T2) of the first annular sealing lip and an axial projection length (L2) of the same first annular sealing lip is between 0.25 and 0.43.

13. The motor cycle suspension according to claim 12, wherein the radially outer portion has a second, flexible, annular sealing lip which projects, protruding in a radially and axially external direction, so as to cooperate, during use, in a sliding manner, with the surface of the first component of the motorcycle suspension, said second annular sealing lip being in an axially external position with respect to the first annular sealing lip, in order to provide a first seal against external contaminants.

14. The motor cycle suspension according to claim 13, wherein the ratio between a thickness (T1) of the second annular sealing lip and an axial projection length (L1) of the same second sealing annular lip is between 0.20 and 0.39.

15. The motor cycle suspension according to claim 14, wherein the radially outer portion has a contaminant collection zone, radially internal with respect to the second annular sealing lip.

16. The motor cycle suspension according to claim 15, wherein a surface area (A) of the collection zone is not less than 1.2 mm$^2$.

17. The motor cycle suspension according to claim 16, wherein the radially inner portion has an axially internal surface which provides a static seal by interference with an annular surface of the second component of the motorcycle suspension.

18. The motor cycle suspension according to claim 17, wherein the radially inner portion has an inner diameter which acts as a guide in the assembly of the sealing device on the second component of the motorcycle suspension.

19. The motor cycle suspension according to claim 18, wherein the first component of the motorcycle suspension is a swing arm or a triangular lever and the sealing device provides a dynamic seal by the first annular sealing lip with the surface of the swing arm or the triangular lever.

20. The motor cycle suspension according to claim 19, wherein the second component of the motorcycle suspension is a pivot pin of the swing arm or the triangular lever and that said sealing device is stably connected to the pivot pin by a forced connection between the armature and a lateral surface of the pivot pin.

* * * * *